United States Patent
Light et al.

(10) Patent No.: US 6,192,380 B1
(45) Date of Patent: Feb. 20, 2001

(54) AUTOMATIC WEB BASED FORM FILL-IN

(75) Inventors: John Light, Hillsboro; John Garney, Aloha, both of OR (US)

(73) Assignee: Intel Corporation, Santa Clara, CA (US)

( * ) Notice: Under 35 U.S.C. 154(b), the term of this patent shall be extended for 0 days.

(21) Appl. No.: 09/052,902

(22) Filed: Mar. 31, 1998

(51) Int. Cl.$^7$ ..................................... G06F 7/06
(52) U.S. Cl. .................. 707/505; 707/506; 707/507; 707/508; 707/9; 707/10
(58) Field of Search ................... 707/505, 506, 707/507, 508, 9, 10

(56) References Cited

U.S. PATENT DOCUMENTS

| | | | |
|---|---|---|---|
| 5,640,577 | * 6/1997 | Scharmer | 395/768 |
| 5,794,259 | * 11/1998 | Kikinis | 707/507 |
| 5,802,518 | * 9/1998 | Karaev et al. | 707/9 |
| 5,931,907 | * 8/1999 | Davies et al. | 709/218 |
| 5,963,952 | * 5/1999 | Smith | 707/102 |
| 5,974,430 | * 10/1999 | Mutschler | 707/505 |
| 6,029,245 | * 2/2000 | Scanlan | 713/200 |

OTHER PUBLICATIONS

Laura Lemay's Teach Yourself Web Publishing with HTML 3.2. pp. 555,560,561,562,757. Copyright 1996 by Sams.net Publishing, 1996.*

* cited by examiner

*Primary Examiner*—Thomas G. Black
*Assistant Examiner*—Thuy Do
(74) *Attorney, Agent, or Firm*—Blakely, Sokoloff, Taylor & Zafman LLP

(57) ABSTRACT

A method and apparatus for automatic web form fill-in is provided. A web page is accessed. A form included in the web page is recognized. Data is automatically filled into the form from a database.

19 Claims, 7 Drawing Sheets

| Tags | Data | Authorization | Learned? |
|---|---|---|---|
| Christian Name<br>First Name<br>Given Name | John | None | Yes |
| Family Name<br>Last Name | Light | None | No |
| Social Security Nr.<br>Social Security Number<br>Soc. Sec. Num.<br>SSN | 555-55-5555 | BofA<br>NOT CheapLoans<br>NOT EasyCredit<br>IRS<br>Schwab account | Yes |
| Card Number<br>Credit Card Nr.<br>Mastercard/Visa | 6000 0001 0001 00001 | Secure Sites Only | No |
| Mother's Maiden Name | 01/01/70 | ONLY IRS | No |

Fig. 6

AUTOMATIC WEB BASED FORM FILL-IN

FIELD OF THE INVENTION

The present invention relates to , and more specifically, to

BACKGROUND

The World-Wide Web (WWW, W3, the Web) is an Internet client-server hypertext distributed information retrieval system. An extensive user community has developed on the Web since its public introduction. On the Web everything (documents, menus, indices) is represented to the user as a hypertext object in hypertext markup language (HTML) format. Hypertext links refer to other documents by their universal resource locators (URLs). The client program, known as a browser, e.g. NCSA Mosaic, Netscape Navigator, runs on the user's computer and provides two basic navigation operations: to follow a link or to send a query to a server.

A variety of client and server software is freely available. Most clients and servers support "forms" which allow the user to enter arbitrary text as well as selecting options from customizable menus and on/off switches. As more business is transacted on the Web, forms are proliferating. The forms may include forms for requesting further information, for ordering items from the Web, for registering for a Web site, etc.

Currently, the user has to fill out each of these forms separately. Generally, the forms request the same types of information, i.e. name, address, telephone number, e-mail address, etc. The user has to enter all of this information for each form. This is repetitious and takes time. Additionally, if such information as credit card number or social security number is requested, the user has to pull out the credit card and copy a long string of numbers. This makes errors likely. Furthermore, the user has to verify that a Web site that requests a credit card number or similar information generally kept confidential, is of the appropriate level of security for the user to feel comfortable sending the information over the Web.

SUMMARY OF THE INVENTION

A method for filling in forms in a web page is described. A web page is accessed. A form included in the web page is recognized. Data is automatically filled into the form from a database.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6 illustrates sample database entries.

DETAILED DESCRIPTION

A method and apparatus for automatic web form fill-in is described.

Figure 1:
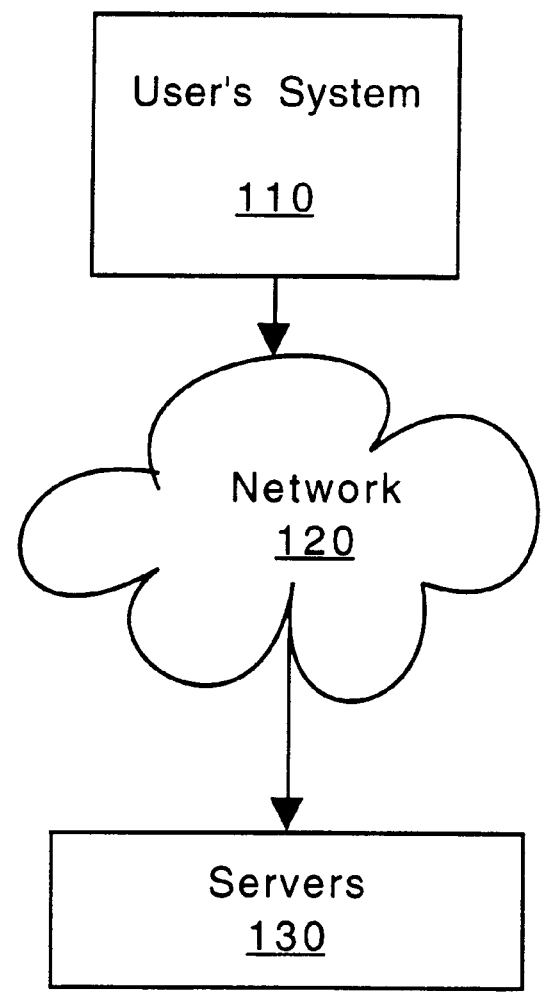
FIG. 1 is one embodiment of a network on which the present invention may be implemented.

FIG. 1 is one embodiment of a network on which the present invention may be implemented. The user's system, a client, 110 is coupled to a network 120. The client 110 may be coupled to the network 120 via a modem connection, an Ethernet connection, a local area network (LAN), a wide area network (WAN), or any other type of network connection. Servers 130 are coupled to the network 120. For one embodiment, the server 130 may be the same computer as the client 110. For one embodiment, these servers 130 provide Web pages to the user via the network 120. These Web pages may include forms, as will be discussed below.

Figure 2:
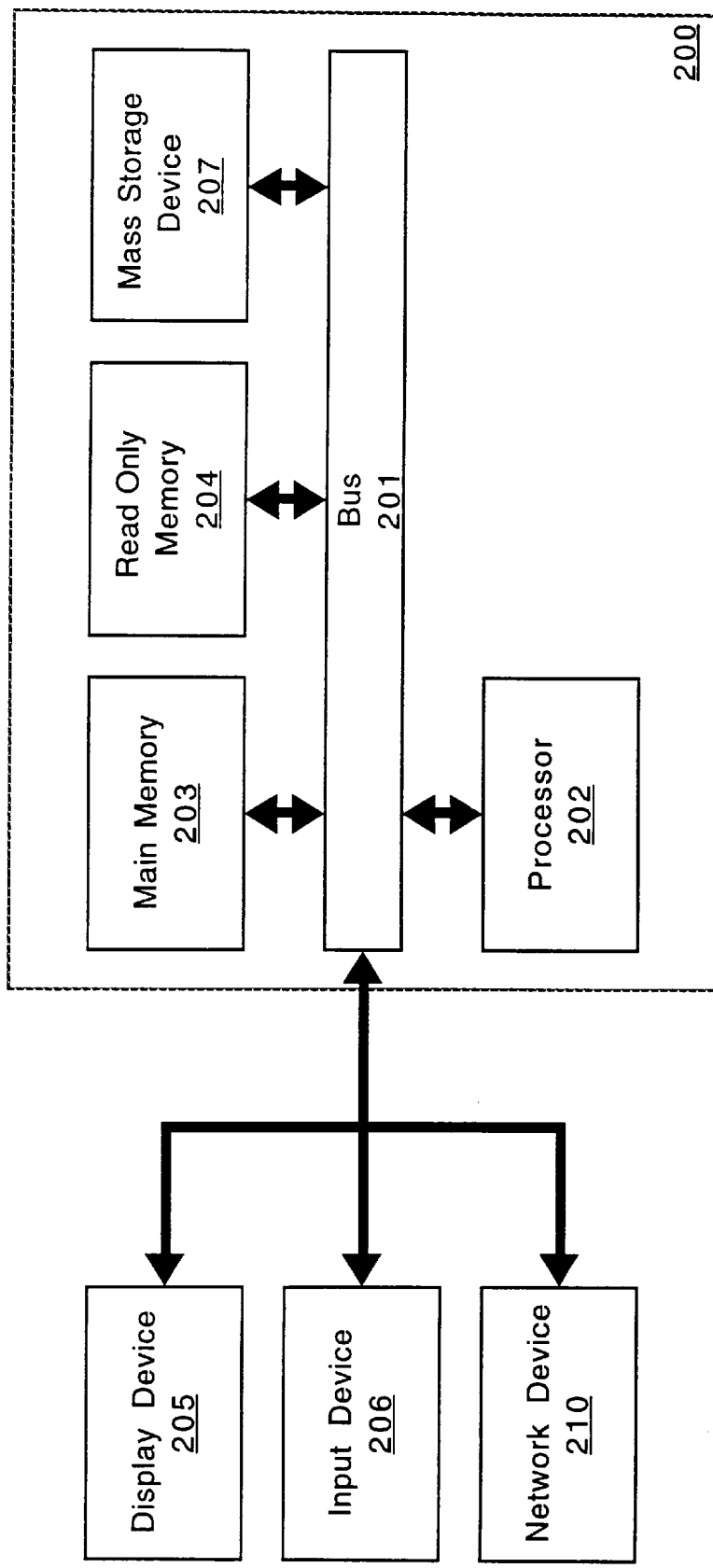
FIG. 2 is one embodiment of a computer system on which the present invention may be implemented.

FIG. 2 is one embodiment of a computer system on which the present invention may be implemented. FIG. 2 is a block diagram of the computer system 200 in which an embodiment of the present invention can be implemented. Computer system 200 comprises a bus 201 or other communication means for communicating information, and a processor 202 coupled with bus 201 for processing information. Computer system 200 also comprises a read only memory (ROM) and/or other static storage device 204 coupled to bus 201 for storing static information and instructions for processor 202.

The computer system 200 further comprises a main memory 203, a dynamic storage device for storing information and instructions to be executed. Main memory 203 also may be used for storing temporary variables or other intermediate information during execution of instructions. In one embodiment the main memory 203 is dynamic random access memory (DRAM).

Computer system 200 can also be coupled to a display device 205, such as a cathode ray tube (CRT) or liquid crystal display (LCD) screen, for displaying information to a computer user. An alphanumeric input device 206 is typically coupled to the computer system 200 for communicating information and command selections to processor 202. The input device 206 may be a cursor control device 206, such as a mouse, a trackball, trackpad, or cursor direction keys for communicating direction information and command selections to processor 202, and for controlling cursor movement on display device 205. Alternatively, other input devices 206 such as a stylus or pen can be used to interact with the display. Multiple input devices 206 may be coupled to the computer system 200.

The computer system 200 may further be coupled to a network device 210. The network device 210 may be a modem, an Ethernet link, or similar device for connecting the computer system 200 to a network.

Figure 3:
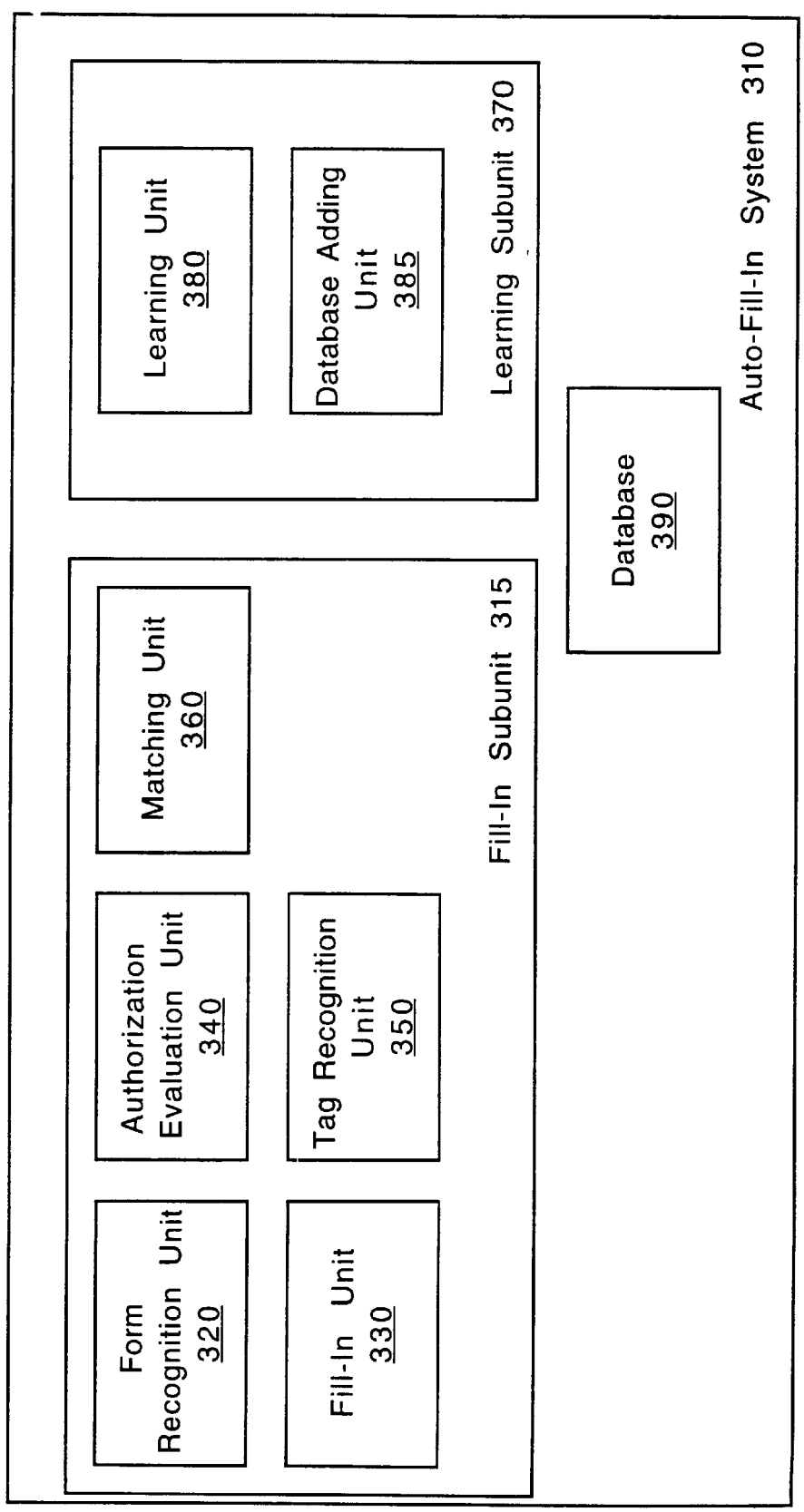
FIG. 3 is a block diagram illustrating one embodiment of the present invention.

FIG. 3 is a block diagram illustrating one embodiment of the present invention. For one embodiment, the present invention is part of a browser. A browser is a program which allows a person to read hypertext. The browser gives some means of viewing the contents of web pages (or nodes) and of navigating from one node to another. For an alternative embodiment, the present invention is not part of a browser, but rather an independent software unit, that interacts with the browser. The browser receives a web address from the user, and opens the corresponding web page.

The auto-fill-in system 310 includes a fill-in subunit 315 and a learning subunit 370. The fill-in subunit 315 includes a form recognition unit 320. When a form is included in the web page the form recognition unit 320 notes that there is a form. For one embodiment, the form includes an hypertext markup language (HTML) tag such as "form", or "input type" indicating that it is a form or that it requires user input. The auto-fill-in system 310 then inspects the source code for the page, and recognizes tags associated with blank spaces in the form. For example, a form may look as follows:

> We encourage you to enter your credit card number on-line, this is why it's secure. However, you also have the option of phoning us with the number.
>
> Please enter your e-mail address: ☐
>
> My password is: ☐
>
> Have you forgotten your password?
>
> My credit card type is: ○ MC   ○ Visa   ○ AmEx
>
> My credit card number is: ☐

The source code of the form may look as follows:

<form method=POST action=/exec/obidos/order-form-page1/6474-2122890-104042>

We encourage you to enter your credit card number online (<ahref="/exec/obidos/subst/help/payment.html/6474-2122890-104042#credit-cards"><fontsize="-1">why this is safe</font></a>). However, you also have the option of phoning us with the number.

<blockquote>

Please enter your e-mail address:
    <input type=text name=email size=40 value=""><br>

My password is <input type="password" size="20"name="password" maxlength=20>.<br>

<a href="/exec/obidos/subst/ordering/forgot-password.html/6474-2122890-104042">Have you forgotten your password?</a><p>

Credit card type

<input type=radio name=creditcardtype=MC>

<input type=radio name=creditcardtype=Visa>

<input type=radio name=creditcardtype=AmEx>

My credit card number is <input type="cardnumber" size="16" name="cardnumber" maxlength=24>.<br>

</blockquote>

The form recognition unit 320 recognizes tags such as "input type" that connote forms. The form recognition unit 320 then passes the entire source of the web page to the tag recognition unit.

The tag recognition unit 350 then scans the form, and determines what the form is asking for. Thus, for example, in this instance, the name of the first item is "email". Alternately, the tag recognition unit 350 may recognize the label displayed to the user for the specified entry. Thus, for example the text "please enter your e-mail address" may be recognized by the tag recognition unit 350, and "e-mail address" extracted from it. For one embodiment, the displayed label or the "name" associated with the blank is the tag recognized by the tag recognition unit 350. For one embodiment, the name associated with the blank is the preferred tag.

Once the tag recognition unit 350 has extracted a tag, it passes the tag to the matching unit 360. The matching unit 360 searches in the database 390 for a similar tag. For one embodiment, the matching unit 360 has some intelligence, and corrects singulars v. plurals, misspellings, words that were combined into a single word, etc. Some of the entries in the database are illustrated in FIG. 6. The matching unit 360 determines whether there is a tag that is "email" or "e-mail address". If the matching unit 360 finds a matching tag in the database 390, it passes the tag, the data associated with the tag, and the authorization of the tag to the authorization evaluation unit 340.

The authorization evaluation unit 340 determines whether there are any restrictions on the data. Such restrictions may include restricting the data to only specific sites, or only secure sites, and similar restrictions. The authorization evaluation unit 340 compares the web page with the authorization data associated with the information. If the web page is authorized to receive the data, the authorization evaluation unit 340 passes the data to the filling unit 330. The filling unit 330 inserts the data into the space associated with the tag.

In this way, the spaces in the form are filled in. If, for example, there are blank spaces, the auto-fill-in system 310 waits for the user to fill in any blanks. When the user presses enter, or otherwise indicates that the form is completely filled in, the learning subunit 370 scans the form, and determines whether there are any spaces that were filled in by the user, not the fill-in subunit 315. The learning subunit 370 then extracts the tags and data associated with these user-filled-in spaces, and passes them to the learning subunit 370.

The learning subunit 370 determines whether the data already exists in the database 390. If it does, the database adding unit 385 adds the new tag to the list of tags associated with the information in the database 390. If the data is not in the database 390, the database adding unit 385 adds the new data and the new tag to the database 390.

Figure 4:
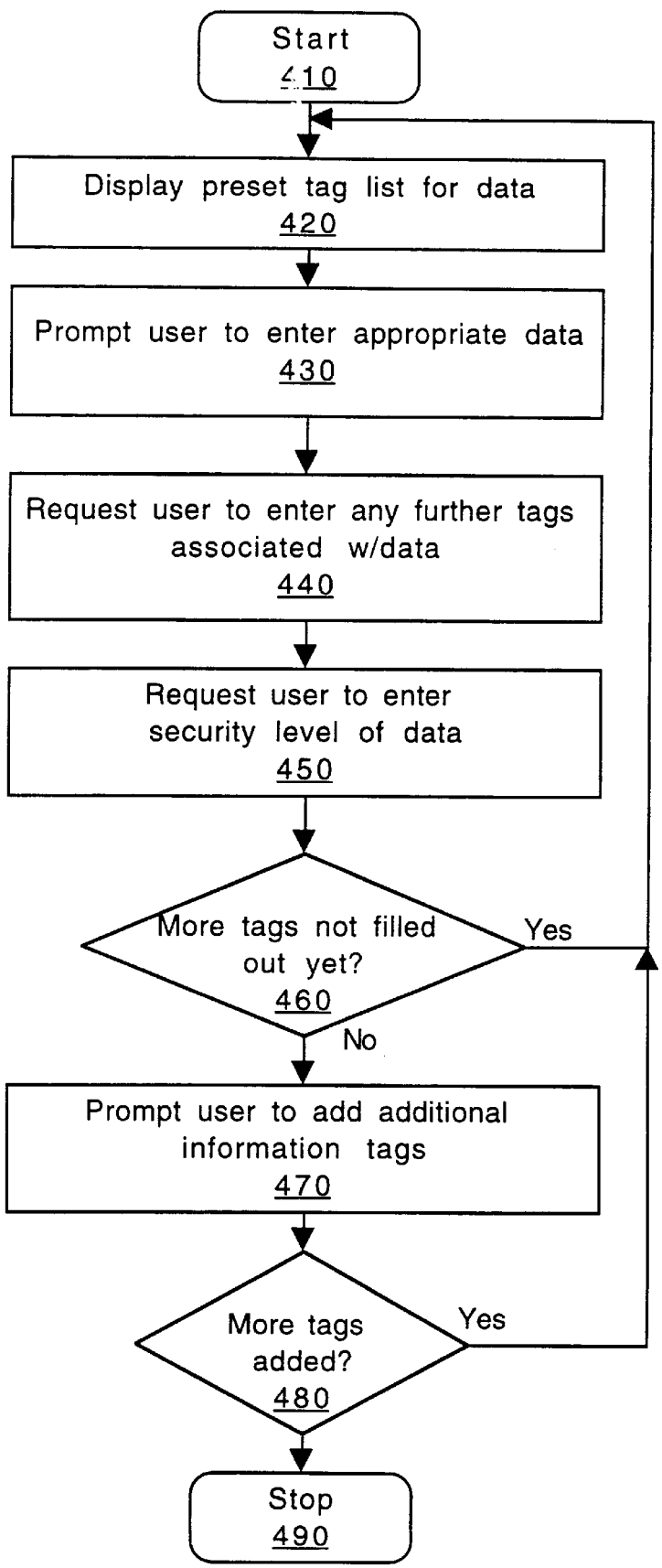
FIG. 4 is a flowchart illustrating one embodiment of the initial setup of the present invention.

FIG. 4 is a flowchart illustrating one embodiment of the initial setup of the present invention. Generally, the user will wish to initially enter the personal information to be filled into the various forms. Alternatively, this step may be skipped, and the system may only learn from user input, as will be described below.

At block 410, the initial setup starts. At block 420, the existing list of tags is displayed. For example, this list of tags may include "First name", "Last Name", "e-mail address", etc. For one embodiment, this list of tags may be included with the application. Alternatively, the user may be questioned for tags initially.

At block 430, the user is prompted to enter appropriate data for the existing tags. This may include information such as a name, e-mail address, credit card numbers, social security number, etc.

At block 440, the user is requested to enter further tags associated with the data. Thus, for example, when the user enters his or her first name, in response to a tag asking for a "first name", the user may add other tags, such as "given name", etc.

At block 450, the user is requested to enter the authorization level for the data. Data may be divided into multiple categories, as illustrated for example in FIG. 6. Data may have no authorization restrictions. Information such as name and e-mail address may be generally released to all sites that ask for them.

Alternately, data may be restricted to only a certain one or list of sites. Thus, for example, for a social security number, the user may enter that the social security number may be released to the IRS, to the user's bank, etc. The user may further specify locations to which the information should not be released. Thus, for example, if there is page that is regularly visited that the user does not wish to release the data to, negative authorizations may also be entered.

A second type of authorization includes exclusive authorization. This is illustrated in FIG. 6 as well. The entry tagged "mother's maiden name" which is often used by credit card companies for identification, may be restricted to be released only to the IRS. An authorization restricted as exclusive may include a list of one or more locations to which the data may be provided. When the user encounters a form that asks for data restricted by exclusive authorization, i.e. a page that asks for the user's mother's maiden name, the system does not query whether the user wishes to fill in the information. Rather, if the site is not in the list of sites, the system does not fill in the information, and assumes that the user will not release the information.

A third type of authorization is "secure site" authorization. Secure site authorization may include sites that have a verified certification from a recognizes certification authority, this may include encrypted sites, or otherwise secured sites. The security level may be set by the user. For one embodiment, all sites running secure hypertext transmission protocol (https) or a secure sockets layer (SSL) are deemed secure sites. Alternative authorization levels may be included, or may be defined by the user.

At block 460, the system tests whether there are any blank tags remaining. The user may indicate that he or she does not wish to enter data for a preexisting tag. In that instance, the data associated with that tag is set to null, but not considered a blank tag for the purposes of the preliminary entry of data.

If there are blank tags, the system loops back to block 420, and displays the tag list that has not been completed. If there are no blank tags, the system continues to block 470.

At block 470, the user is prompted to add additional tags. The user may, for instance, often use a system that requires age information. Thus, the user may add "age" as a tag, and fill in his or her age as data. At block 480, the system tests whether more tags have been added. If more tags were added, the system returns to block 420, and displays the added tags to the user for authorization level, etc. If no more tags were added by the user at block 470, the preliminary data gathering is ended, and the flowchart stops at block 490.

Figure 5A:
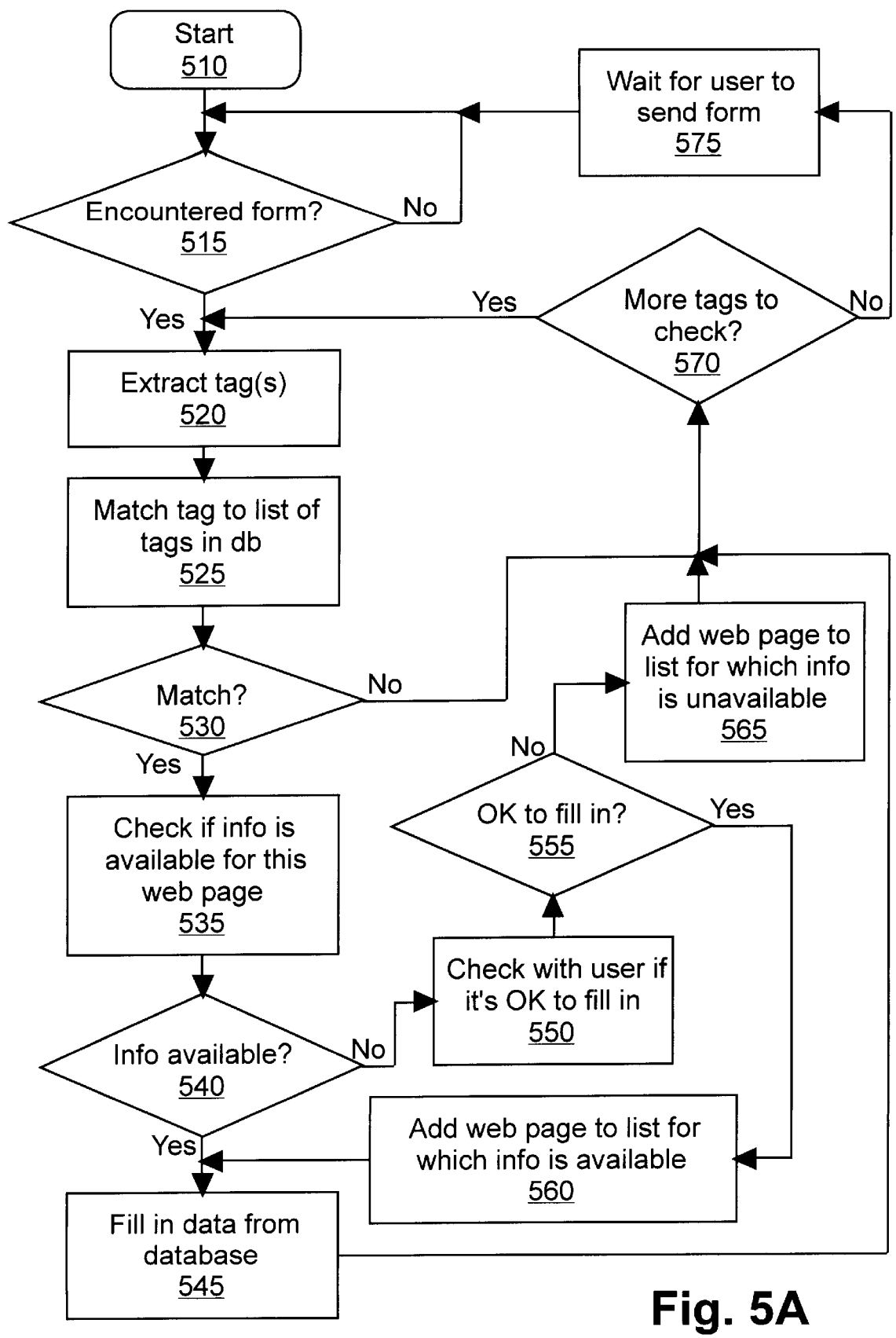
FIG. 5A is a flowchart illustrating one embodiment of the fill-in process.

FIG. 5A is a flowchart illustrating one embodiment of the fill-in process. The process starts at block 510. At block 515, the process tests whether a form has been encountered. If no form has been encountered, the process returns to block 515. For one embodiment, this process is activated every time a new web page is opened. For one embodiment, the process runs in the background. If no forms were found at block 515, the process returns to the background state, at block 510. If a form is found, the process continues to block 520. Alternatively, the fill-in process may be activated by the user. For one embodiment, the user may activate the fill-in process by pressing a key, a key combination, a left mouse button, or a similar activation mechanism.

At block 520, a tag is copied. Each form has at least one entry blank to be filled in by the user. A least one tag is associated with every entry blank, indicating what the user should enter into the form. For one embodiment, the name of the input is copied as a tag. Thus, in the example above, the name "cardnumber" may be copied as a tag. For another embodiment, a displayed label associated with the entry blank may be copied. Thus, the text "My credit card number is:" is copied, and the tag "credit card number" is extracted from the text. For another embodiment, both the displayed label and the name are extracted as tags.

At block 525, the tag is matched to a list of tags in the database. The database includes all of the tags originally supplied, tags entered by the user, and tags learned, as will be discussed later. The extracted tag is compared to the tags in the database.

At block 530, the process tests whether there was a match between the extracted tag and the list of tags in the database. If there is no match, the process goes to block 570. At block 570, the process tests whether there are any more tags to check. If there are tags remaining to be checked, the process returns to block 520. If there are no remaining tags to be checked, the process continues to block 575, and the process waits for the user to send the form. If, at block 530, a match was found, the process continues to block 535.

At block 535, the process tests whether the data associated with the matching tag found in the database is available for this web page. As discussed above, there are various levels of authorization for data. Thus, at block 535, the process tests whether the data is authorized to be released to the web page in question.

At block 540, the process determines whether or not the data is available. If the data is available, the process continues to block 545. At block 545, the data is filled into the form. The process then continues to block 570, where it tests whether there are any more tags to check.

If, at block 540, it is determined that the data is not available, the process continues to block 550. For one embodiment, the process collects all of the data that is not properly authorized, and tests authorization for all of the data at the same time. In other words, only after no blank spaces remain does the process continue to block 550.

At block 550, the user is queried whether it is acceptable to fill-in the data. For one embodiment, the user is queried only if the authorization level is not set to exclusive authorization. For another embodiment, the user is not queried if the page is on the exclusion list, as described above.

At block 555, it is tested whether it is acceptable to fill-in the data. If it is acceptable to fill-in the data, the process continues to block 560. At block 560, the web page is added to the list of authorized sites for which the data is available. The process then continue to block 545.

At block 555, if it is determined that it is not acceptable to enter the data, the process continues to block 565. At block 565, the web page is added as a negative authorization That is, if this web site is encountered in the future, the user is not queried whether the data is available, but rather, the blanks are automatically left blank. From block 565, the process returns to block 570, and queries whether there are more tags to check.

Figure 5B:
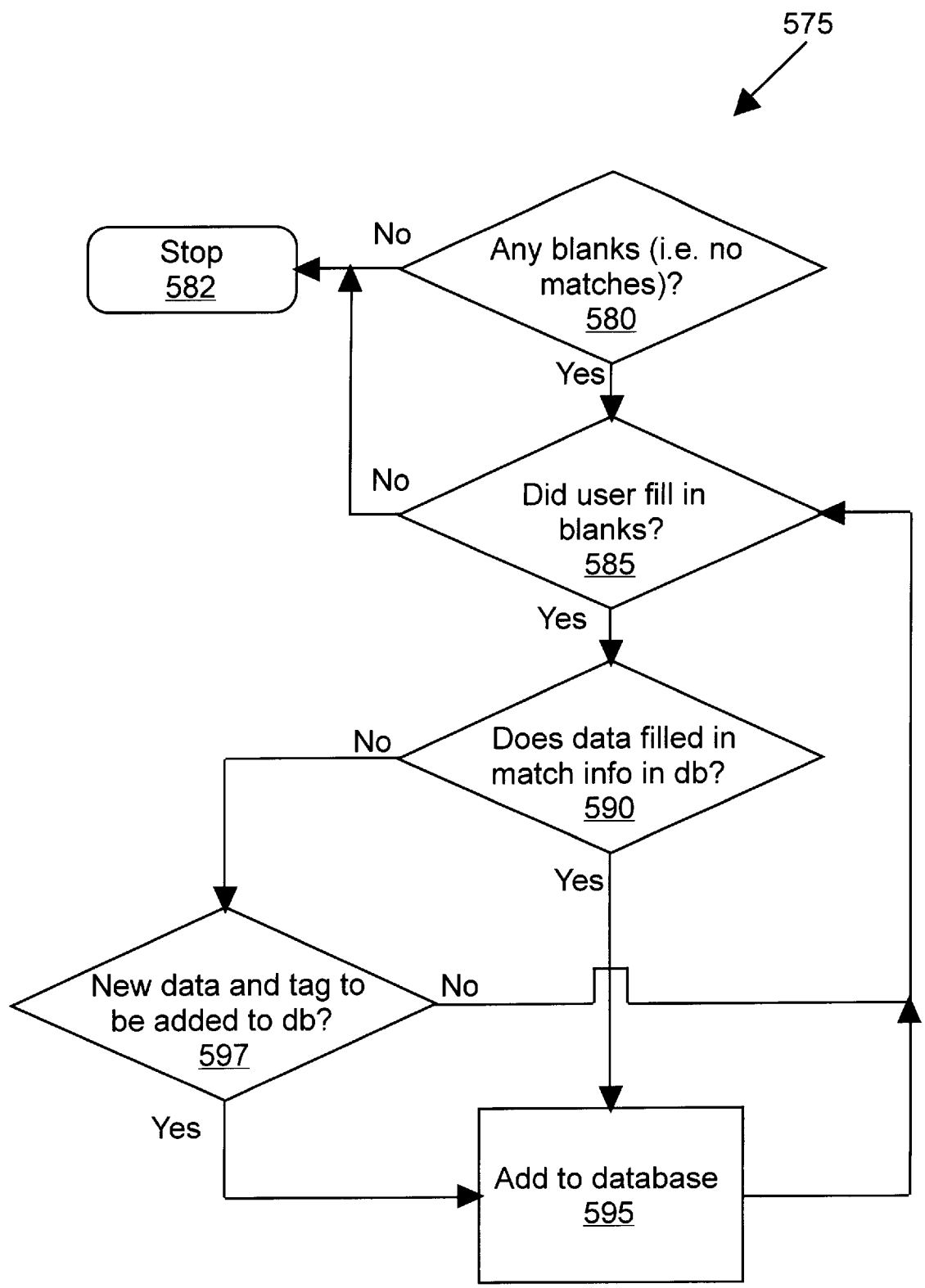
FIG. 5B is a flowchart illustrating the learning process associated with the fill-in process of FIG. 5A.

FIG. 5B is a flowchart illustrating the learning process associated with the fill-in process of FIG. 5A. In FIG. 5A, the blanks are automatically filled by the system. When the last blank is filled in, the system waits for the user to send the form, at block 575. However, the user may enter additional data prior to sending the form. FIG. 5B illustrates the process occurring concurrently with, or after, waiting for the user to send the form, at block 575 of FIG. 5A.

Returning to FIG. 5B, at block 580, the system tests if there are any blanks, i.e. areas which the automatic fill-in did not complete. If there are no blanks, the learning process is finished. If there are blanks, the system, at block 585, tests whether the user filled in any of the blanks. In many forms, areas may be left blank. Thus, the user may not chose to complete every entry on the form. If, at block 585, the process finds that the user did not fill in any blanks, the learning process is finished. If the user filled in at least one blank, the process continues to block 590.

At block 590, the system queries whether the data filled in matches information in the database. This is applicable if a different tag is used by the web page for known data. For example, the tag "Christian name" may be used in a foreign web page, for the data tagged "first name" in the database. The data entered by the user would still be "John", or the appropriate first name.

If the data matches information in the database, the process continues to block 595. At block 595, the new tag is added to the list of tags associated with the information found in the database. Thus, the tag "Christian name" would be added to the tags associated with the data "John" in the above example. The process then returns to block 585, to query whether any other blanks were filled in by the user.

If, at block 590, it is found that the data does not match information in the database, the process continues to block 597.

At block 597, the user is queried whether the new data should be added to the database. If the user replies in the negative, the process returns to block 585, and the system again queries whether any other blanks were filled in by the user. If the user replies in the affirmative, the process continues to block 595. At block 595, the new tag and new data associated with it are added to the database. For another embodiment, the tag and data are automatically added to the database.

FIG. 6 illustrates sample database entries, as discussed above. Other data may of course be included in the database. Alternative arrangements of data may include not having an authorization, not having an indicator whether anything in the list was learned, etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
   recognizing a form in a web page;
   identifying information to be filled into the form;
   determining whether data corresponding to the information to be filled into the form is authorized by a user to be disclosed to the web page;
   automatically filling the data into the form from a database if the data is authorized by the user to be disclosed to the web page.

2. The method of claim 1, wherein recognizing the form further comprises extracting tags from the web page.

3. The method of claim 2, wherein recognizing the form further comprises:
   comparing the tags with a stored tag list in the database;
   identifying a matched tag; and
   inserting the data corresponding to the matched tag into the form.

4. The method of claim 3, wherein determining whether the data corresponding to the information to be filled into the form is authorized to be disclosed to the web page comprises:
   determining an authorization of the data; and
   comparing the authorization of the data with an authorization level of the web page.

5. The method of claim 4, further comprising:
   if the web page is not authorized for the data, prompting the user to decide whether the web page should be authorized for the data; and
   if the user decides that the web page should be authorized for the data, inserting the data and adding the web page to a list of authorized web pages for the data.

6. The method of claim 5 further comprising, if the user decides that the web page should not be authorized for the data, adding the web page to a list of not authorized web pages for the data.

7. The method of claim 1, further comprising:
   determining if the user filled additional data into blank fields in the form;
   if the user did fill additional data into blank fields in the form, determining if the additional data corresponds to data already stored in the database; and
   if the additional data corresponds to data already stored in the database, adding a tag associated with the additional data to a list of tags associated with the data already stored in the database.

8. The method of claim 7, further comprising:
   determining if the list of tags has an authorization list; and
   if the list of tags has an authorization list, adding the web page on which the blank field was found to the authorization list for the data already stored in the database.

9. The method of claim 7, further comprising:
   determining if the additional data does not correspond to the stored data;
   if the additional data does not correspond to the stored data, storing the additional data and the tag associated with the additional data in the database.

10. The method of claim 9, further comprising automatically authorizing the additional data for the web page on which the blank fields were found.

11. The method of claim 9, further comprising prompting the user to enter a security level for the additional data entered into the blank fields.

12. A method comprising:
   opening a web page;
   recognizing a form in the web page;
   extracting tags from the form in the web page;
   comparing the tags with a stored tag list in the database;
   identifying a matched tag in the database;
   determining whether the web page is authorized for the data corresponding to the matched tag;
   if the web page is authorized for the data, inserting the data into the form in the web page; and
   if the web page is not authorized for the data:
      prompting a user to decide whether the web page should be authorized for the data;
      if the user decides that the web page should be authorized for the data:
         inserting the data into the form; and
         adding the web page to a list of authorized web pages for the data; and
      if the user decides that the web page should not be authorized for the data, adding the web page to a list of unauthorized web pages for the data.

13. A system comprising:
   a plurality of personal data, tags, and an authorization level associated with the personal data;
   a form recognition unit for recognizing information requested by a form in a web page;
   an authorization evaluation unit for determining the authorization level of the personal data corresponding to the information requested by the form, and for determining an authorization level of the web page; and
   a fill-in unit for filling the personal data from the database into the form, if the authorization evaluation unit authorizes the personal data for the web page.

14. The system of claim 13, further comprising a tag extraction logic for extracting tags from the form in the web page.

15. The system of claim 15, further comprising:
- a matching unit for comparing the tags extracted from the form with a stored tag list in the database and identifying a matched tag; and
- wherein said fill-in unit receives the personal data from the matching unit if the matched tag is found.

16. The system of claim 16, wherein the authorization evaluation unit authorizes the matching unit to pass the personal data to the fill-in unit if the web page is authorized for the personal data.

17. The system of claim 17, wherein the authorization evaluation unit determines whether the web page should be authorized for the data and, if the web page should be authorized for the data, inserts the data and adds the web page to a list of authorized web pages for the data.

18. The system of claim 13, further comprising:
- a learning subunit for adding personal data to the database, the personal data being entered by a user and not having been previously included in the database.

19. A method comprising:
- opening a web page;
- recognizing a form in a web page;
- extracting tags from the web page;
- comparing the tags with a stored tag list in a database;
- identifying a matched tag;
- determining whether data corresponding to the matched tag is authorized to be disclosed to non-listed sites;
- prompting a user to decide if the web page should be authorized for the data, if the data is not authorized to be disclosed to non-listed sites; and
- inserting the data corresponding to the matched tag into the form, if the user decides that the web page should be authorized for the data, or if the data is authorized to be disclosed to non-listed sites.

* * * * *